June 2, 1970     L. K. IRWIN     3,515,483
METHODS OF AIMING AND DETERMINING MISALIGNMENT
OF VEHICLE HEADLIGHTS
Filed Feb. 10, 1966     3 Sheets-Sheet 1
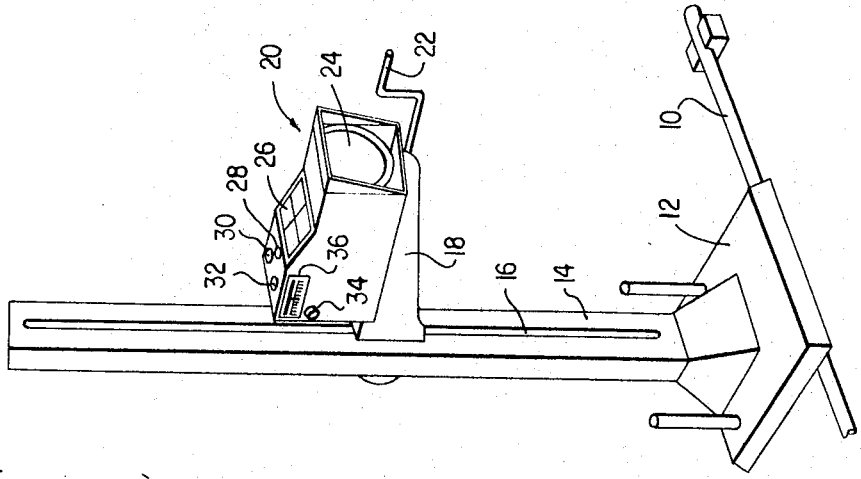
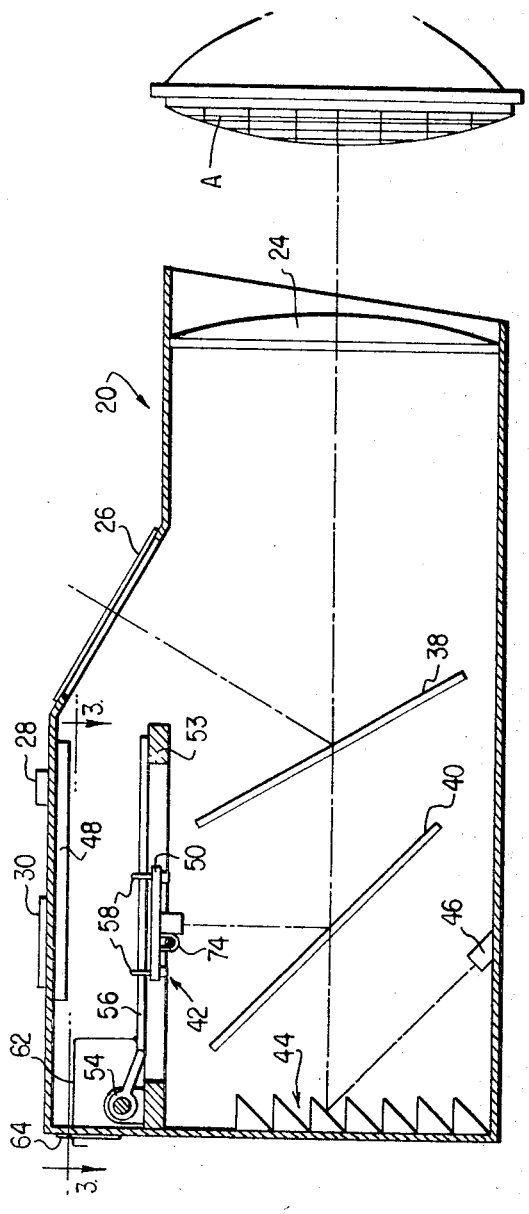
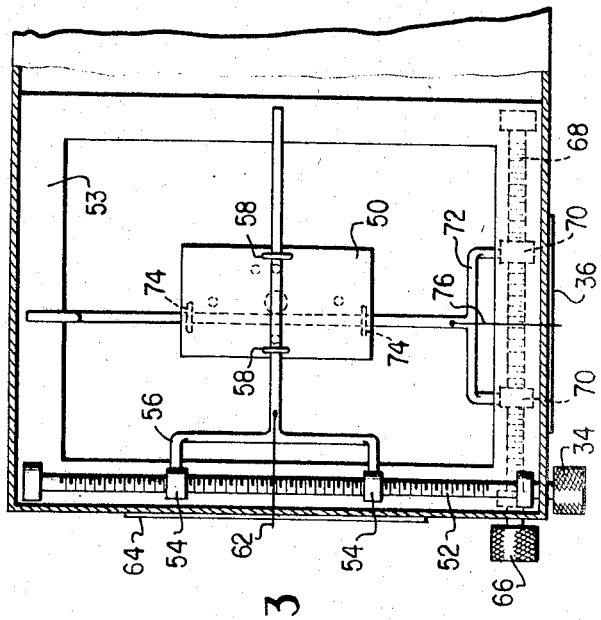
INVENTOR
LEE K. IRWIN
BY Burns, Doane, Benedict, Swecker & Mathis
ATTORNEYS.

June 2, 1970    L. K. IRWIN    3,515,483
METHODS OF AIMING AND DETERMINING MISALIGNMENT
OF VEHICLE HEADLIGHTS
Filed Feb. 10, 1966    3 Sheets-Sheet 2
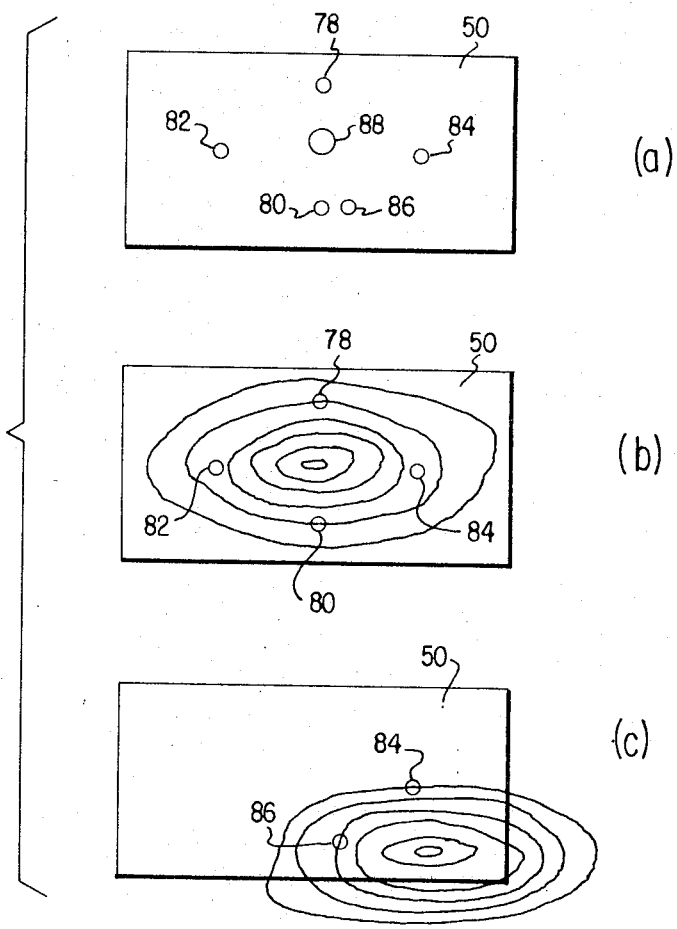
FIG. 4
FIG. 5
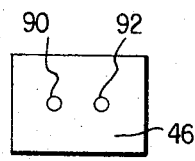
INVENTOR
LEE K. IRWIN
BY *Burns, Doane, Benedict, Swecker, & Mathis*
ATTORNEYS.

INVENTOR
LEE K. IRWIN

United States Patent Office 3,515,483
Patented June 2, 1970

3,515,483
METHODS OF AIMING AND DETERMINING
MISALIGNMENT OF VEHICLE HEADLIGHTS
Lee K. Irwin, Emporia, Kans., assignor to Hopkins
Manufacturing Corp., Emporia, Kans., a corporation of Kansas
Filed Feb. 10, 1966, Ser. No. 526,598
Int. Cl. G01j 1/00
U.S. Cl. 356—121                              7 Claims

ABSTRACT OF THE DISCLOSURE

Methods of aiming and determining the misalignment of headlights involving the generating of a beam image of substantially constant light intensity. The light intensity of one or more peripheral portions of a normal image of the beam is measured and compared with the light intensity of the reference image of substantially constant light intensity. The location of the normal image, where the light intensity measurements of peripheral portions bear desired fractional relationship to the light intensity of the reference image, determine either a condition of desired alignment or a degree of misalignment of the beam.

GENERAL BACKGROUND, OBJECTS AND SUMMARY OF INVENTION

The present invention relates to methods for aiming vehicle headlights, and more particularly to methods for accurately aiming both high and low beams of vehicle headlight systems.

The headlights of a modern motor vehicle are designed to accurately project high intensity beams of light to illuminate certain portions of the road in front of the vehicle. In normal highway operation of the vehicle, the headlights should project high beams of light so as to substantially illuminate the entire width of the highway at a substantial distance in front of the vehicle. However, for city operation of the vehicle or in highway operation when the vehicle meets an oncoming car, the headlights of the vehicle should be switched to a low beam. This low beam should be directed downwardly and to the right of the high beam, in order not to blind an oncoming motorist. Both the high and the low beams should be accurately aimed in order to provide maximum visibility at night for the driver of the vehicle while preventing excessive glare for the drivers of oncoming cars.

In certain vehicle headlight systems, both the high and low beam lamp filaments are located within a unitary sealed lamp unit. After factory installation, these lamp units require only aiming of the high beam, as the low beam position will automatically be adjusted by the high beam aiming operation. More recently, dual headlight systems have been introduced which include two pairs of sealed lamp units. Both lamp units of each pair are illuminated to obtain the high beam, while only one lamp unit of each pair is illuminated to provide the low beam. Therefore, in the dual headlight systems, both the high and the low beam positions must be separately aimed.

Devices have been heretofore developed to aid in correctly aiming the beam position of vehicle headlights. Certain of these devices require the projection of the headlight beam on a large screen located at a substantial distance from the vehicle. An operator determines the proper aim of the headlight beam by observing the position of the beam pattern with respect to reference lines on the screen. As the beam patterns do not have sharp boundary lines, these devices have sometimes been found to be subject to human error and have generally not been accurate.

Devices have also been developed which comprise photoelectric cells arranged in the path of the headlight beam and connected together by suitable electric circuits so that light intensities of the four quadrants of the high beam may be compared. These photoelectric devices have been found generally suitable for aiming the symmetrical high light intensity area of the high beam. However, the critical points of a low beam which must be aimed in order not to blind drivers of oncoming cars are the low intensity top and left edges of the beam. Aiming devices previously developed have not generally been satisfactory for correctly and accurately aiming both the light intensity area of the high beam and the low intensity top and left edge portions of the low beam of vehicle headlight systems. Additionally, the aiming devices heretofore developed have not been completely satisfactory with respect to the ease of operation and accuracy of aiming which are required for vehicle inspection stations and vehicle assembly plants.

Accordingly, a general object of the present invention is the provision of vehicle headlight aiming methods which substantially eliminate or minimize the disadvantages of headlght aiming systems heretofore available.

A more specific object is the provision of headlight aiming methods which enable both the high and the low beams to be accurately aimed.

Yet another object of the instant invention is the provision of methods for conveniently and accurately aiming a low beam of a vehicle headlight system.

Another object of the present invention is the provision of methods which enable the low intensity edges of a low beam to be correctly aimed, as well as enabling the high intensity portion of the high beam to be aimed.

Yet another object is the provision of headlight aiming methods which enable the correct aiming of an edge portion of the low beam having a predetermined fraction of the light intensity of the high intensity area of the low beam.

A further object is the provision of headlight aiming methods which may be used for conveniently indicating the magnitude of misalignment of a headlight beam of a vehicle headlight system.

Yet a further object of the invention is the provision of headlight aiming methods which may be used to accurately indicate the magnitude of misalignment of both the high and the low beams.

In achieving these and other objects that will be apparent hereafter, the instant invention contemplates methods for initially determining the magnitude of misalignment of a headlight beam utilizing movable light responsive elements which are moved until they are directly in the path of predetermined portions of the headlight beam. An indication of the position of the movable light responsive means may then be utilized to indicate the magnitude of misalignment of the headlight beam.

The present invention further contemplates methods for aiding in accurately aiming both the high and the low beams of a headlight system. The high beam is directed upon a first light responsive means and the headlight unit is adjusted until opposite quadrants of the high beam are accurately positioned. The low beam is directed upon both the first and a second light responsive means and then the headlight unit is adjusted until an indicator visually indicates when the magnitude of light received by the first light responsive means is equal to a predetermined fraction of the magnitude of light received by the first light responsive means.

DRAWINGS

The invention and its many advantages will be further understood by reference to the following detailed description illustrated in the accompanying drawings, in which:

FIG. 1 is a perspective view of the headlight aiming device according to the instant invention;

FIG. 2 is a schematic cross sectional side view of the optical system of the headlight aiming device according to the present invention;

FIG. 3 is a top view of a portion of the optical system shown in FIG. 2 taken generally along section line 3—3;

Figure 6:
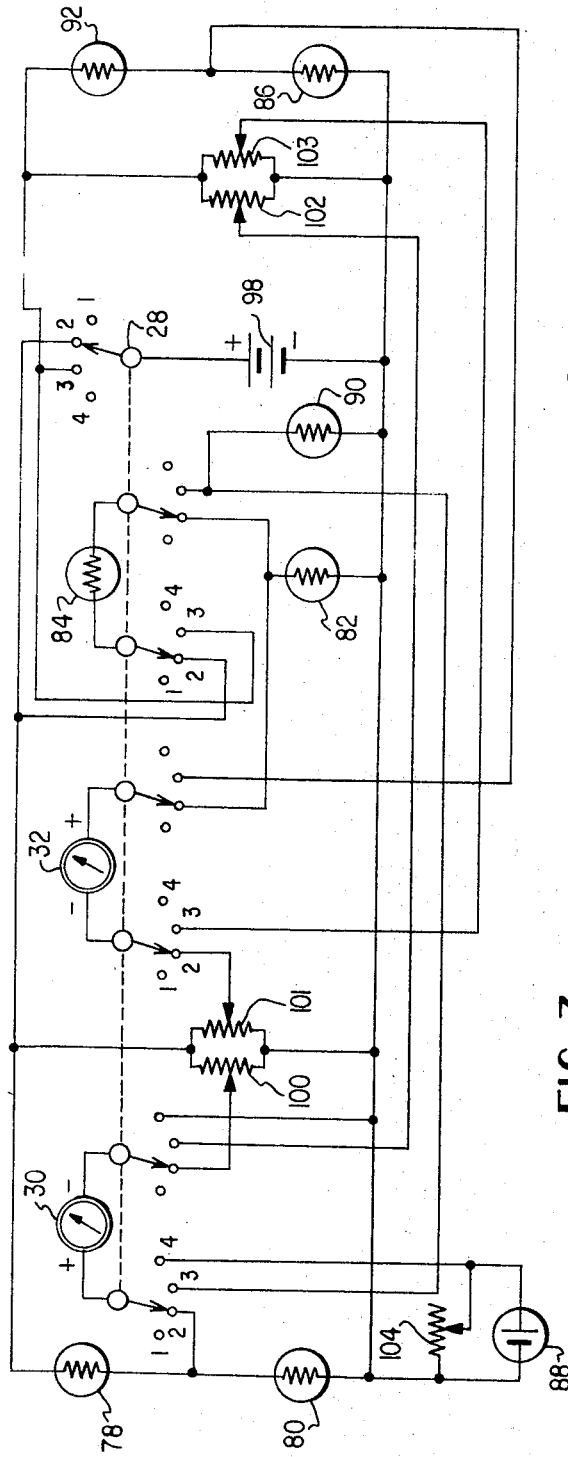
Figure 8:
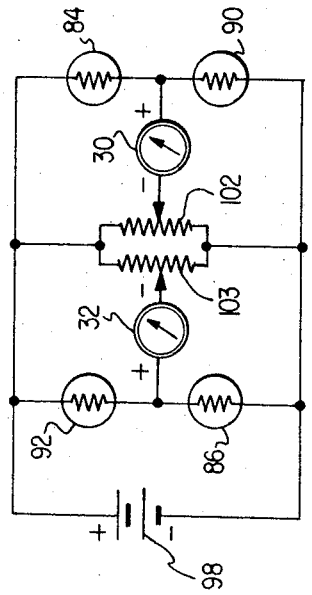
Figure 7:
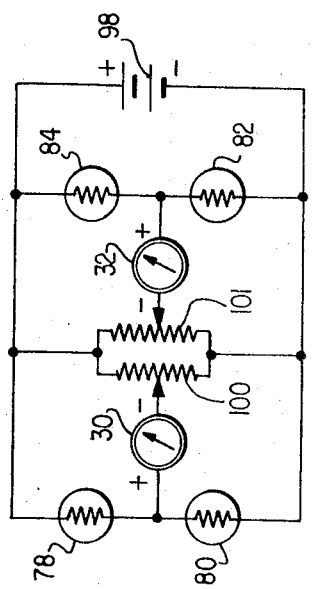

FIGS. 4a–c are diagrammatical views of the adjustable light responsive assembly of the instant invention;

FIG. 5 is a schematic view of the fixed light responsive assembly of the invention;

FIG. 6 is a circuit diagram of the light responsive system of the present invention;

FIG. 7 is a circuit diagram of the connected portions of the circuit shown in FIG. 6 in the high beam aiming mode of operation; and FIG. 8 is a circuit diagram of the connected portion of the circuit shown in FIG. 6 during the low beam aiming mode of operation of the instant device.

Referring now to FIG. 1, a track 10 is fixedly attached to a floor in front of the headlights of a vehicle to be tested and aligned substantially perpendicularly to the longitudinal axis of the vehicle. A base 12 is equipped with flanged wheels, not shown, which engage the track 10 to allow movement of the base 12 along the front of the vehicle to be tested. Base 12 may be equipped with conventional stop members for holding the base in a desired position, but which are adjustable to allow the base 12 to freely roll along track 10. Connected to base 12 is an elongated upright structure 14 which includes a groove 16 substantially throughout its length. An aiming head base 18 is vertically slidably mounted in the groove 16 so that the height of the aiming head base 18 from the floor may be adjustable. An aiming head 20 is mounted upon the aiming head base 18, and thus is adjustable in height from the floor for testing of headlights on different types of vehicles. The aiming head 20 may also include a leveling system to allow adjustment of the housing to compensate for floor level variation.

A retractable arm 22 is connected to the aiming head base 18 for generally positioning aiming head 20 in front of a headlight so that the headlight beam enters the aiming head 20 through a focusing lens 24. In a manner to be later described, the headlight beam is projected onto a translucent screen 26 of the aiming head 20 to allow for initial visual alignment of the light beam. The screen 26 is positioned on the top of aiming head 20 and is slanted for easy visibility for the operator. A mode control knob 28 is disposed on top of the aiming head 20 for switching the instant device between different modes of operation. Meters 30 and 32 indicate when the headlight beam is correctly aimed, as will be subsequently described. Adjustment knob 34 and scale 36 may be utilized to determine how far in inches and in which direction the headlight beam is out of aim.

The operation of the aiming head 20 can be best understood by reference to FIG. 2, wherein the path of a light beam from the headlight A is shown projecting into the aiming head 20. Focusing lens 24 focuses the headlight beam on a canted semi-transparent mirror 38, which reflects part of the headlight beam onto the translucent screen 26 to enable the position of the headlight beam to be visually observed. The remainder of the headlight beam passes through the semi-transparent mirror 38 onto a second semi-transparent mirror 40, which is positioned at a canted angle different from that of mirror 38 to reflect a portion of the light onto the movable light responsive assembly 42. The remaining portion of the light from the headlight beam is then passed through semi-transparent mirror 40 onto a diffusing surface 44, where the light is diffused and reflected downwardly to fall upon the fixed light responsive assembly 46. The portion of the light from the headlight beam reflected by the semi-transparent mirror 40 to the assembly 42 may be substantially equal to the portion of the light passed through the mirror 40 to the diffusing surface 44.

A housing 48 containing electrical circuitry which connects the mode control knob 28 to the meters 30 and 32 is attached to aiming head 20. Both light responsive assemblies 42 and 46 are also connected to the electrical circuitry contained in housing 48. The assemblies 42 and 46 may then be selectively switched into the electrical circuitry in order that both the high and low beams may be correctly aimed, as will be subsequently described.

Light responsive assembly 42 includes a movable base 50 which may be moved in a lateral direction by the adjustment of control knob 34 (FIG. 1). As best shown in FIG. 3, a threaded rod 52 is rotatably mounted on a base member 53 for being rotated by the control knob 34. Nuts 54 are threaded upon the threaded rod 52 and are moved when the rod 52 rotates. Rigidly connected to the nuts 54 is a bifurcated frame 56 which is loosely connected to base 50 by means of staples 58. The staples 58 allow base 50 to slide along the longitudinal axis of frame 56, but move the base 50 laterally with respect to the aiming head 20 in response to adjustment of control knob 34. Connected to the frame 56 is a wire pointer 62 which moves along a scale 64 in order to provide an indication of the lateral position of base 50.

A second control knob 66, located on the back of aiming head 20, may be adjusted to rotate threaded rod 68 to control the movement of the nuts 70 which are threadedly connected to rod 68. A bifurcated frame 72 is connected to the nuts 70 and is slidably attached to base 50 by means of staples 74. Adjustment of knob 66 then moves the base 50 along the longitudinal axis of aiming head 20. A wire pointer 76 indicates on scale 36 the longitudinal position of the light responsive assembly base 50. Thus, base 50 may be selectively positioned in the aiming head 20 by rotation of control knobs 34 and 66.

The movable base 50 of the light responsive assembly 42 contains a number of light responsive elements, as shown in FIG. 4a. Light responsive elements 78, 80, 82, 84 and 86 are composed of like material and are disposed on base 50 to allow correct aiming of both the high and the low beam of a vehicle headlight system. The light responsive elements may be comprised of a semiconductor material which exhibits a resistance which varies in proportion to the amount of light intensity received, such as cadmium sulphide. The resistance of the light responsive elements will be used in an electrical circuit, to be subsequently described, to determine relative intensities of portions of headlight beams. A conventional photocell 88, which emits a magnitude of current dependent upon the magnitude of illumination, is also disposed on the base 50 to give an indication of the total candle-power of a headlight beam.

FIG. 4b diagrammatically shows how the light responsive element located on base 50 may be utilized in one mode of operation of the headlight aiming device to determine the correct aim of a high beam. Element 86 and photocell 88 have been omitted from the drawing for clarity of illustration. The image of the high beam which is reflected to base 50 from the semi-transparent mirror 40 is shown diagrammatically as having intensity lines representing the change in intensity from the high intensity center to the low intensity edges. Light elements 78 and 80 are utilized to vertically align the high beam of a vehicle headlight system, while light responsive elements 82 and 84 are used to correctly aim the horizontal aim of the high headlight beam. As seen in FIG. 4c, where several of the elements have again been omitted for clarity of explanation, two of the light responsive elements on base 50 may also be utilized in a second mode of operation to indicate the correct aim of a low headlight beam. Light responsive element 84 indicates the intensity of light in a top portion of a low beam while light responsive element 86 indicates the light intensity of a left edge portion of the low beam. These indications of light intensities are utilized in the electrical balance circuit to be later described.

FIG. 5 shows the location of light responsive elements 90 and 92 on the fixed light responsive assembly 46. Elements 90 and 92 may be made of semiconductor material such as cadmium sulphide and are disposed in aiming head 20 to receive light reflected from the diffusing surface 44. The intensity of the reflected light received by elements 90 and 92 will remain substantially constant even during the adjustment of the headlight beam, due to the diffusion of the light caused by surface 44. This magnitude of light received by elements 90 and 92 is utilized in the electrical circuit of the invention to represent unity intensity. The location of edge portions of the headlight beam having light intensities which are of a predetermined fraction of the unity intensity may then be determined by the electrical circuit, as will be later explained.

Considering FIG. 6, the electrical circuit connecting the light responsive elements of the present invention is shown. Mode control knob 28, disposed on top of aiming head 20 as shown in FIG. 1, controls the operation of a gang switch having six switching sections shown connected with the dotted line. Mode control knob 28 may be adjusted to switch the electrical circuit into any of four operating positions. Each of the meters 30 and 32 is connected between two switching sections of the gang switch in order to be selectively switched between the various operating modes of the electrical circuit. A voltage supply source 98, which may be a storage battery of magnitude suitable to energize the light responsive elements, may also be selectively switched in the circuit. Potentiometers 100, 101, 102, and 103 are each divided into two resistance portions by a movable arm and are each connected in the circuit to be switched between the various operating modes.

As seen in FIG. 6, when mode control knob 28 is in position 1, voltage supply source 98 is not connected to the circuit and the circuit is then inoperative. When the mode control knob 28 is moved to position 2 the elements of the circuit are connected in the configuration shown in FIG. 7. Light responsive elements 78 and 80 are then connected with the two resistance portions of the potentiometer 100 to form the four resistance branches of a conventional Wheatstone bridge. The voltage source 98 energizes the bridge and meter 30 is connected across the bridge to indicate a balancing of the resistance branches of the bridge. Additionally, a second Wheatstone bridge is formed by the light responsive elements 82 and 84 in connection with the two resistance portions of the potentiometer 101. Meter 32 indicates the balancing of the second Wheatstone bridge.

As seen in FIG. 4b, elements 78 and 80 are disposed along the vertical axis of the high beam. If the movable arm of the potentiometer 100 is set approximately in the middle of the potentiometer, the two resistance portions of the potentiometer 100 will be substantially equal. Then if the light intensities received by the light responsive elements 78 and 80 are equal, the resistances of the light responsive elements will be equal and meter 30 will null as will be understood by one skilled in the art. However, if the light intensities received by elements 78 and 80 are unequal, meter 30 will indicate an unbalance of the circuit. Similarly, light responsive elements 82 and 84 are disposed on base 50 for correctly positioning the horizontal axis of the high beam. Potentiometer 101 will normally be adjusted to provide two equal resistance portions, and so if the intensities of light received by elements 82 and 84 are equal, meter 32 will be nulled.

The mode control knob 28 may also be switched to positions 3 (FIG. 6) in order to provide the connected low beam measuring circuit shown in FIG. 8. Light responsive elements 86 and 92 are then connected across the resistance portions of potentiometer 103, and meter 32 provides a visual indication of the balance of the Wheatstone bridge formed by the elements and the resistance portions. Similarly, light responsive elements 84 and 90 are connected across the two resistance portions of potentiometer 102. Element 84 is thus switched to be used in both the circuits shown in FIGS. 7 and 8. Light responsive elements 90 and 92 will present higher resistances to the Wheatstone bridge configurations than elements 84 and 86, as the elements 90 and 92 receive light from the highest intensity area of the beam, representing unity intensity, at the fixed light responsive assembly 46. Therefore, the movable arms of both potentiometers 102 and 103 are adjusted so that meters 30 and 32 null when light responsive elements 84 and 86 receive predetermined fractions of the unity intensity received by elements 90 and 92.

For instance, potentiometer 103 may be calibrated to enable meter 32 to null when element 86 receives one-fifth the light intensity received from light responsive element 92. Potentiometer 102 may be adjusted to provide a null of meter 30 when element 84 receives an intensity equal to one-third the light intensity received by element 90. While it will be understood that the fractions of the unity intensity necessary to null meters 30 and 32 may be varied according to different specifications or regulations, the novel method and apparatus of the instant invention allow edge portions of a low headlight beam to be exactly determined with respect to the highest intensity area of the beam to allow correct aiming of the low beam.

Mode control knob 28 may also be moved to position 4 (FIG. 6), thereby disconnecting all light responsive elements except photocell 88. The photocell 88 is then connected across meter 30 in order to give an indication of the total candlepower of the headlight beam to assure optimum performance of the headlight system. A variable resistance 104 is provided to enable meter 30 to be calibrated to accurately indicate total candlepower.

The sequence of operation of the method and apparatus of the present invention will now be described. Aiming head 20 is generally positioned in front of the headlight of a vehicle by means of the retractable arm 22 (FIG. 1). Light passes through the focusing lens 24 and is focused upon the semi-transparent mirrors 38 and 40. Images of the beam are thus projected upon screen 26 and base 50. Mode control knob 38 is moved to position 2, thereby providing the light responsive circuit shown in FIG. 7. The position of base 50 is adjusted by rotation of knobs 34 and 66 until the high beam illuminates the light responsive elements on base 50 in the manner shown in FIG. 4b. Meters 30 and 32 will null to indicate when this position of the base 50 with respect to the unadjusted light beam has been reached.

Sometimes the law permits a degree of misalignment of a headlight, the allowable misalignment degree benig sometimes defined as a number of inches in a twenty-five feet projection of the headlight beam. The operator of the instant headlight aiming device may determine the initial magnitude of misalignment of a high beam when the meters 30 and 32 are nulled by observing the indications provided by the wire pointers 62 and 76 on scales 36 and 64. The scales may be calibrated to indicate how many inches and in which direction the headlight beam is out of aim with respect to the standard twenty-five feet projection distance. Hence, the operator may quickly and accurately determine whether or not the high beam is within the given degree of misalignment without closely aligning the headlight system with the instant device and without projecting the headlight beam upon a distant or remote screen, and additionally without having to visually estimate the intensity of the light. If the high beam is within the allowed degree of misalignment, no further adjustment of the headlight is necessary.

However, if the headlight beam is excessively out of alignment, the base 50 is returned to its normal center position (FIG. 3) by adjustment of knobs 34 and 66. The indications of scales 36 and 64 and the visual display of the beam on translucent screen 26 will allow the operator to make initial course adjustments of the high beam unit. The operator then observes the indications of meters 30 and 32 while finely adjusting the high beam unit until the high beam illuminates base 50 as shown in FIG. 4b, wherein meters 30 and 32 will null to indicate the correct aim of the beam. Mode control knob 28 may then be moved to position 4 where meter 30, in response to photocell 88, may provide an indication of the total candlepower of the high beam.

The aiming head 20 may then be moved in front of the low headlight beam and the mode control knob 28 moved to position 3 (FIG. 6). Movable base 50 is then adjusted in position until meters 30 and 32 null to indicate that light responsive elements 84 and 86 are illuminated by portions of the low beam having predetermined fractional intensities of the light received by assembly 46, as shown in FIG. 4c. The operator may then visually obtain an indication of how far in inches and in which direction the low beam is out of aim by observing scales 36 and 64, in the manner previously described. If the low beam is seen to be excessively out of aim, base 50 is moved to the normal center position shown in FIG. 3, and the operator coursely adjusts the low beam unit to an approximately aimed position by observing the translucent screen 26 and by utilizing the indications of scales 36 and 64. The headlight is then adjusted in small increments until both meters 30 and 32 are again nulled, thus indicating that the top and left fractional intensity edges of the low beam are correctly positioned with respect to the light response elements 84 and 86 (FIG. 4c).

From the foregoing description, it will be apparent that the headlight aiming method and apparatus of the present invention enables the high and low beams to be quickly and accurately initially checked to determine the magnitude of misalignment. If adjustment is necessary, the high and the low beams may then be accurately and correctly adjusted according to their differing characteristics. This headlight aiming may be performed with a very compact apparatus with a minimum of dependence upon the skills of the operator. The instant method of determining the correct aim of the headlights may be done quickly and with a degree of accuracy heretofore unobtainable.

While a preferred environment has ben described for the invention, the invention also includes a method which would not be limited to the exact apparatus illustrated. It should also be understood that modifications of both the method and apparatus which do not depart from the essence of the present invention are obvious to those skilled in the art.

What is claimed is:

1. A method of determining the magnitude of misalignment of a vehicle headlight means, said method comprising:

provisioning an aiming device at a location to receive an image of a low beam generated by a portion of vehicle headlight means and with a stationary reference portion of said device being positioned at a desired alignment position in relation to said headlight means;

directing a first image of said low beam generated by said portion of said headlight means upon movable light intensity detecting means;

directing a second image of said low beam upon a diffusing surface, with said diffusing surface reflecting a diffused image, to a fixedly positioned light intensity detecting means, and with said second image having substantially uniform light intensity throughout;

obtaining a measurement of the intensity of light of said second image in response to the operation of said fixedly positioned light intensity detecting means; and moving said movable light intensity detecting means through an increment, relative to said stationary reference portion of said aiming device, until a measurement of the intensity of light of a peripheral portion of said first image of said low beam, by said movable light intensity detecting means, bears a desired fractional relationship to the magnitude of intensity of light of said second image as detected by said fixedly positioned light intensity detecting means;

said increment of movement of said movable light intensity detecting means indicating a general degree of misalignment of said low beam of said vehicle headlight means.

2. A method of determining the magnitude of misalignment of vehicle headlight means, said method comprising:

providing stationary reference means at a location spaced from vehicle headlight means;

forming a reference image of a beam generated by said headlight means with said reference image being of substantially uniform light intensity throughout;

detecting the general light intensity of said reference image generated by said vehicle headlight means;

detecting the location of a first peripheral portion of an image of said beam generated by said headlight means, within which first peripheral portion the intensity of light generally bears a desired fractural relationship to the light intensity of said reference image; and detecting the location of a second peripheral portion of said image of said beam generated by said headlight means, within which second peripheral portion the intensity of light generally bears a desired fractional relationship to the light intensity of said reference image; and said detected locations of said first and second peripheral portions of said image of said beam relative to said reference means being generally indicative of the magnitude of misalignment of said beam.

3. A method of determining the magnitude of misalignment of vehicle headlight means, said method comprising:

providing stationary reference means at a location spaced from vehicle headlight means;

forming a diffused image of a low beam generated by said headlight means;

detecting the general light intensity of said diffused image of said low beam generated by said vehicle headlight means;

detecting the location of a first peripheral portion of one quadrant of an image of said low beam generated by said headlight means, within which first peripheral portion the intensity of light generally bears a desired fractional relationship to the light intensity of said diffused image; and detecting the location of a second peripheral portion of another quadrant of said image of said low beam generated by said headlight means, with said other quadrant being circumferentially adjacent said one quadrant and within which second peripheral portion the intensity of light generally bears a desired fractional relationship to the light intensity of said diffused image; and said detected locations of said first and second peripheral portions of said image of said low beam relative to said reference means, being generally indicative of the magnitude of misalignement of said low beam.

4. A method of aiming vehicle headlight means, said method comprising:

providing stationary reference means at a fixed location relative to vehicle headlight means;

forming a reference image of a beam generated by said vehicle headlight means with said reference image being of substantially uniform light intensity throughout;

detecting the light intensity of said reference image generated by said headlight means;

directing an image of said beam generated by said headlight means upon light intensity indicating means positioned at a desired position of headlight alignment relative to said reference means; and adjusting the position of a peripheral portion of said image at said position until light intensity of said peripheral portion detected by said light intensity indicating means bears a desired fractional relationship to the detected light intensity of said reference image.

5. A method of aiming vehicle headlight means, said method comprising:

positioning an aiming device at a location to receive an image of a low beam generated by a portion of vehicle headlight means, and with a stationary reference portion of said device being positioned at a desired alignment position in relation to said headlight means;

locating movable light intensity means at an alignment position relative to said reference means operable to receive an image of said low beam when said low beam is oriented in desired alignment;

directing a first image of said low beam generated by said other portion of said headlight means upon said light intensity detecting means at said alignment position;

directing a second image of said low beam upon a diffusing surface, with said diffusing surface reflecting a diffused image to a fixedly positioned light intensity detecting means and with said second image having substantially uniform light intensity;

obtaining a measurement of the intensity of light of said second image in response to the operation of said fixedly positioned light intensity directing means; and adjusting the orientation of said headlight means until a measurement of the intensity of the light of a peripheral portion of said first image of said low beam, by said movable light intensity detecting means, bears a desired fractional relationship to the magnitude of intensity of light of said second image as detected by said fixedly positioned light intensity detecting means.

6. A method of aiming vehicle headlight means, said method comprising:

providing stationary reference means at a location spaced from vehicle headlight means;

forming a reference image of a beam generated by said headlight means with said reference means being of substantially uniform light intensity throughout;

detecting the general light intensity of said reference image generated by said vehicle headlight means;

adjusting the location of a first peripheral portion of an image of said beam generated by said headlight means, until the intensity of light of said first peripheral portion generally bears a desired fractional relationship to the light intensity of said reference image; and adjusting the location of a second peripheral portion of said image of said beam generated by said headlight means, until the intensity of light of said second peripheral portion generally bears a desired fractional relationship to the light intensity of said reference image.

7. A method of aiming vehicle headlight means, said method comprising:

providing stationary reference means at a location spaced from vehicle headlight means;

forming a diffused image of a low beam generated by said headlight means;

detecting the general light intensity of said diffused image of said low beam generated by said vehicle headlight means;

adjusting the location of a first peripheral portion of one quadrant of an image of said low beam generated by said headlight means, until the intensity of light of said first peripheral portion generally bears a desired fractional relationship to the light intensity of said diffused image; and adjusting the location of a second peripheral portion of another quadrant of said image of said low beam generated by said headlight means, with said other quadrant being circumferentially adjacent said one quadrant and with the intensity of light of said second peripheral portion generally bearing a desired fractional relationship to the light intensity of said diffused image.

References Cited

UNITED STATES PATENTS

| | | |
|---|---|---|
| 2,604,003 | 7/1952 | Hermann et al. |
| 2,308,095 | 1/1943 | Meeder. |
| 2,381,586 | 8/1945 | Green. |
| 2,663,216 | 12/1953 | Carr. |

RONALD L. WIBERT, Primary Examiner

T. R. MOHR, Assistant Examiner